United States Patent
Strasser et al.

[11] Patent Number: 6,062,351
[45] Date of Patent: May 16, 2000

[54] INTEGRATED FIBER REINFORCED CERAMIC MATRIX COMPOSITE BRAKE PAD AND BACK PLATE

[75] Inventors: Thomas Edward Strasser, Corona; Steven Donald Atmur, Riverside, both of Calif.

[73] Assignee: Northrop Grumman Corporation, Los Angeles, Calif.

[21] Appl. No.: 09/351,574

[22] Filed: Jul. 12, 1999

Related U.S. Application Data

[62] Division of application No. 08/976,254, Nov. 21, 1997, Pat. No. 5,984,055.

[51] Int. Cl.[7] ............................................. F16D 69/00
[52] U.S. Cl. .................... 188/251 A; 29/233; 264/241; 264/257; 264/510
[58] Field of Search .................... 188/251 A, 218 XL, 188/251 R; 29/889.21, 233; 264/241, 257, 258, 294, 297.4, 510

[56] References Cited

U.S. PATENT DOCUMENTS

| | | | |
|---|---|---|---|
| 4,173,681 | 11/1979 | Durrieu et al. | 188/218 XL X |
| 4,552,252 | 11/1985 | Stahl | 188/73.1 |
| 4,775,705 | 10/1988 | Parker et al. | 523/153 |
| 5,023,041 | 6/1991 | Jones et al. | 264/510 |
| 5,162,136 | 11/1992 | Blum et al. | 427/226 |
| 5,190,709 | 3/1993 | Lukacs, III | 264/63 |
| 5,227,113 | 7/1993 | Hamabe et al. | 264/258 |
| 5,305,520 | 4/1994 | Doorbar et al. | 29/889.21 |
| 5,306,678 | 4/1994 | Yoshida et al. | 501/95 |
| 5,325,941 | 7/1994 | Farinacci et al. | 188/218 |
| 5,435,234 | 7/1995 | Bentz et al. | 92/248 |
| 5,436,042 | 7/1995 | Lau et al. | 428/34.6 |
| 5,560,455 | 10/1996 | Atmur et al. | 188/251 |
| 5,620,791 | 4/1997 | Dwivedi et al. | 188/251 M X |
| 5,738,818 | 4/1998 | Atmur et al. | 264/624 |
| 5,806,636 | 9/1998 | Atmur et al. | 188/251 A |
| 5,964,273 | 10/1999 | Strasser et al. | 164/98 |

Primary Examiner—Robert J. Oberleitner
Assistant Examiner—Pamela J. Lipka
Attorney, Agent, or Firm—Terry J. Anderson; Karl J. Hoch, Jr.

[57] ABSTRACT

An integrated brake pad and back plate having a brake pad section formed from a first fiber reinforced ceramic matrix composite (FRCMC) material and a back plate section formed from a second FRCMC material. The brake pad and back plate are integrated because the sections are molded together to form an integral, unitary structure. The first FRCMC material used in the brake pad section includes a pre-ceramic resin in its ceramic state, fibers and possibly a filler material. The types and amount of these constituents are generally chosen so as to impart characteristics desirable in brake pads, such as high temperature and erosion resistance, and a high coefficient of friction. The second FRCMC material used in the back plate section includes a pre-ceramic resin in its ceramic state and fibers. In this case, the types and amounts of the constituents making up the second FRCMC material are generally chosen to impart the strength to the back plate section necessary to withstand compressive and bending forces placed upon it during braking.

8 Claims, 4 Drawing Sheets

INTEGRATED FIBER REINFORCED CERAMIC MATRIX COMPOSITE BRAKE PAD AND BACK PLATE

CROSS REFERENCE TO RELATED APPLICATION

This application is a divisional of U.S. patent application Ser. No. 08/976,254 filed Nov. 21, 1997, now U.S. Pat. No. 5,984,055.

BACKGROUND

1. Technical Field

This invention relates to brake pad and back plate structures employed on vehicles or machinery, and more particularly, to integrated fiber reinforced ceramic matrix composite (FRCMC) brake pad and back plate structures and methods of integrally molding such structures.

2. Background Art

Any vehicle, such as an aircraft, truck, automobile, train, or the like that employs wheels typically is provided with a brake system with which to stop it. The lighter the combined stopping weight, the fewer the problems involved in designing a brake system which will last for an extended period of time and then be easy and inexpensive to replace or renovate. Thus, a vehicle such as a bicycle can be fitted with small rubber pads that squeeze and grip the rims of the wheels which will last virtually forever and which can be replaced in a few minutes at little expense.

Figure 1:
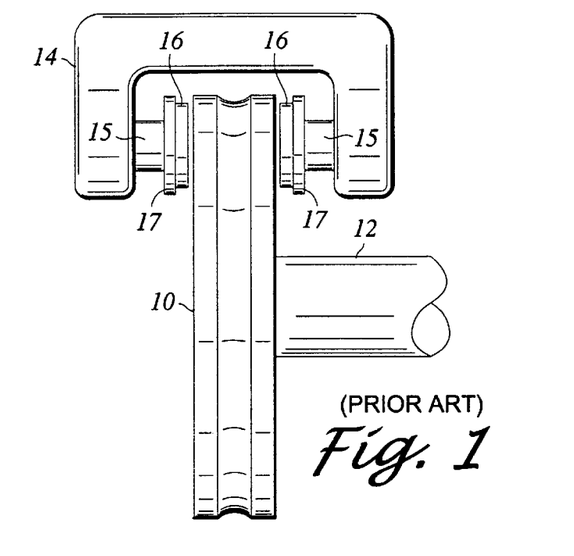
FIG. 1 is a simplified front view drawing of a caliper disk brake of the type used on automobiles.

When one gets to the mass of an automobile, which may contain a number of passengers, frictional heat build-up during stopping becomes a problem to be considered. Most automobiles today employ a so-called caliper disk brakes on at least the front wheels since during stopping the weight of the vehicle is moved forward to the front wheels due to the force of inertia. Disk brakes as depicted in FIG. 1 have good stopping power for various reasons. A rotor 10 carries the wheel (not shown) on a shaft 12. As the wheel rotates, the rotor 10 rotates in combination with it. The rotor 10 is disposed between a caliper 14 having opposing pistons 15 which respectively abut the back plates 17 of a pair of brake pad and back plate assemblies. The brake pad 16 of each assembly is positioned so as to face a respective surface of the rotor 10.

Figure 2:
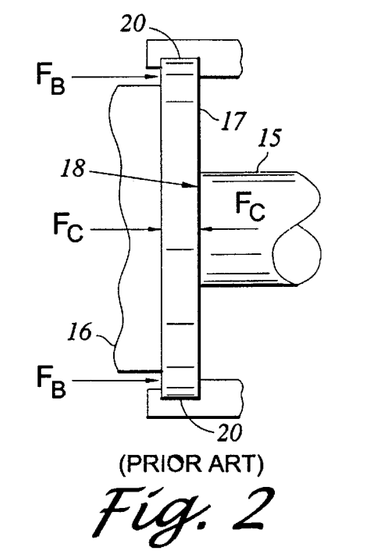
FIG. 2 is a simplified side view of a portion of the caliper disk brake of FIG. 1 showing the forces imparted to the back plate of a brake pad and back plate assembly during braking.

To stop the automobile, hydraulic pressure is typically used to move the pistons 15 together until the rotor 10 is squeezed under pressure between the pads 16. The caliper 14 is attached to the frame of the automobile and so prevents the pistons 15 and brake pad and back plate assemblies from rotating when the pads 16 are pressed against the rotor 10. The pads 16 are made of a high friction material that resists deterioration and wear under fairly high temperature conditions. Thus, when the rotor 10 is squeezed by the brake pads 16, a high frictional stopping force is applied to the rotor 10, bringing the automobile to a stop. Since the pads 16 are flat and contact the flat sides of the rotor 10, the entire area of the pads 16 contacts the rotor 10 to impart the stopping forces. While the brake pads 16 impart the frictional stopping force, the back plate 17 is designed to withstand the considerable compression and bending forces placed on it by the piston 14 when the brake pads are held against the rotor 10. FIG. 2 illustrates the forces placed on the back plate 17 during braking. Typically, a disk brake piston 15 has an annular or circular face 18 that contacts a small area on the back plate 17 generally near the center of the plate's elongated surface. The back plate 17 must first withstand the compressive force ($F_C$) placed on it when the piston 15 is extended to push the brake pad against the rotor. Additionally, it must resist bending under the bending force ($F_B$). This bending force is created when the piston 15 is extended because the back plate 17 is typically restrained at its ends 20 and because the piston 17 pushes against only a small area in the center of the back plate. Should the back plate 17 bend, the brake pad, which is typically brittle in nature, could fracture and fail. Thus, the back plate 17 must be tough and stiff in its longitudinal direction to withstand the compressive and bending forces encountered. The back plate 17 is usually made of metal, typically steel, and has a thickness sufficient to withstand the compressive and bending forces associated with the braking application. For example, a metal back plate 17 s used in brake pad and back plate assemblies on automobiles is typically between about 0.15 and 0.20 inches thick.

Typically, brake pads are riveted to the back plate to form the brake pad and back plate assembly. However, a common problem with this type of assembly is the incidence of the rivets "scoring" the brake rotors when the brake pads wear down too far past the point of needing replacement. More recently with the advent of high strength adhesives, so-called "bonded" brake pads have been employed wherein the pads are attached with adhesive to back plate. With the bonded brake pads and back plate assemblies, the pads can wear to the point that the back plate itself is contacting the drum or rotor before damage can occur. Unfortunately, the use of adhesives to bond the pad to the back plate presents problems of its own. First, the types of high strength adhesives appropriate for use in bonded brake pad assemblies are expensive and tend to be environmentally hazardous. Thus, their use can cause considerable difficulties that increase the costs of the brake pad and back plate assembly, or their use may be prohibited altogether by local environmental protection laws. In addition, the build up of heat in the brake pad and back plate assembly during braking operations can be extreme enough in some systems to burn or degrade many of the aforementioned adhesives. This can lead to detachment of the brake pad and cause the brake to fail. Further, there is typically a large difference in coefficients of thermal expansion between a brake pad made of FRCMC material and a metal back plate structure. This mismatch can cause the adhesive bond between the structures to fail when the bonded brake assembly heats up during braking, thereby also potentially leading to detachment of the brake pad and failure of the brake. The difference in expansion coefficients is particularly acute when a steel back plate is employed (as typically would be the case). In fact, to date the inventors of the present invention have been unable to find an adhesive capable of withstand the mismatch in expansion rate between an FRCMC brake pad and a steel back plate.

Figure 3:
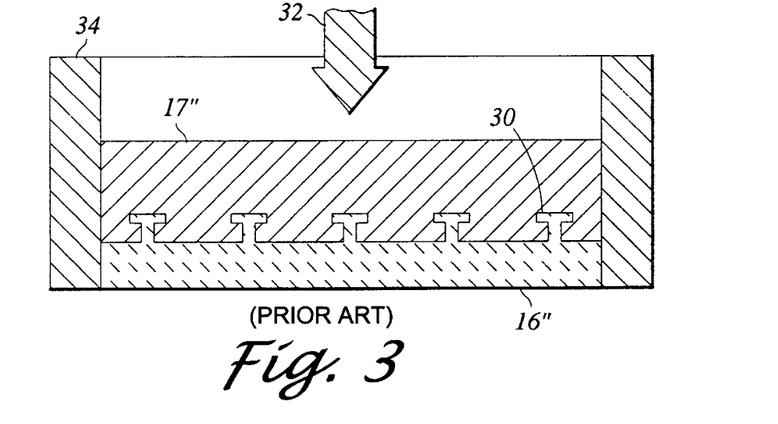
FIG. 3 depicts a method of permanently attaching a FRCMC brake pad to a metal back plate by casting it in place.

Another approach to attaching the brake pad to the back plate was described in a co-pending application entitled BRAKE ROTORS/DRUMS AND BRAKE PADS PARTICULARLY ADAPTED FOR MOTORIZED VEHICLES having the same inventors as the present application and assigned to a common assignee. This co-pending application was filed on Apr. 4, 1996 and assigned Ser. No. 08/627,398 now U.S. Pat. No. 5,806,636. The disclosure of this co-pending application is herein incorporated by reference. The previously disclosed approach involved casting a metal back plate onto a FRCMC brake pad. The FRCMC brake pad was employed because of its capability to withstand high temperature such as those encountered during braking of even large vehicles and machines, as well as being tailorable to provide a desired coefficient of friction. As shown in FIG. 3, FRCMC pads 16" are provided with gripping members 30 extending from the rear thereof. Since the FRCMC pads 16" are able to withstand extremes of temperature including that of molten metal, the back plate 17" can be cast onto the pad(s) 16". Finished pads 16" are placed within a mold 34 used to form the assembly. Molten metal 32 is then poured into the mold 34 and allowed to harden to form the brake pad and back plate assembly. However, even though this casting method worked well, it has been found to be relatively expensive and cost prohibitive for mass production.

Accordingly, there is a need for brake pad and back plate assembly that does not require the use of rivets or adhesives to attach the brake pad to the back plate, thereby avoiding the problems associated with each attachment system. Further, there is a need for a brake pad and back plate that employs a brake pad having the high-temperature and erosion resistance capabilities of FRCMC materials while avoiding the prohibitive costs associated with previously-described cast metal back plate design.

Wherefore, it is an object of the present invention to provide a brake pad and back plate which is integrated in that the brake pad and back plate are formed together as a unitary structure, without the need for rivets, adhesive or casting of metal to attach the brake pad to the back plate.

Wherefore, it is another object of the present invention to provide a brake pad and back plate that is entirely made from FRCMC materials, thereby providing resistance to high temperatures, as well as similar coefficients of expansion.

Wherefore, it is yet another object of the present invention to provide a brake pad and back plate wherein the FRCMC material making up the brake pad is tailored to provide a prescribed coefficient of friction.

Wherefore, it is still another object of the present invention to provide a brake pad and back plate wherein the FRCMC material making up the back plate section of the assembly is chosen so as to provide an enhanced strength capable of withstanding the compressive and bending forces imposed during braking, as well as being lighter in weight than traditional metal back plates.

SUMMARY

The above-described objectives are realized with embodiments of the present invention directed to an integrated brake pad and back plate having a brake pad section formed from a first fiber reinforced ceramic matrix composite (FRCMC) material and a back plate section formed from a second FRCMC material. The brake pad and back plate is referred to as integrated because its sections are molded together to form an integral, unitary structure.

The first FRCMC material used in the brake pad section includes a preceramic resin in its ceramic state, fibers and possibly a filler material. The types and amount of these constituents are generally chosen so as to impart characteristics desirable in brake pads, such as high temperature and erosion resistance, and a high coefficient of friction. The preceramic resin associated with the first FRCMC material can be any of the commercially available polymer-derived pre-ceramic resins, such as silicon-carboxyl resin or alumina silicate resin. The preferred fibers are at least one of alumina, Nextel 312, Nextel 440, Nextel 510, Nextel 550, silicon nitride, silicon carbide, HPZ, graphite, carbon, and peat. These fibers are in the form of non-continuous, loose fibers having lengths of about 0.2 to 5.0 inches depending on the size of the brake pad. The filler material, if used, can increase the coefficient of friction exhibited by the pad section. Examples of an appropriate filler material include at least one of alumina, mullite, silica, silicon carbide, titania, silicon nitride, boron nitride, carbon, magnesium oxide, boron carbide, and other hard ceramic materials. Filler material can also be used to tailor the coefficient of friction exhibited by the brake pad by incorporating sufficient quantities in the first FRCMC material to produce a desired coefficient of friction level. In preferred embodiments of the present invention, the percentage by volume of the first FRCMC material consisting of the fibers can vary within a range of about 15 to 60 percent, the percentage by volume of the first FRCMC material consisting of the filler material can vary within a range of about 0 to 50 percent, and the remaining portion of the FRCMC material not comprising pores is made up of pre-ceramic resin in its ceramic form. It is noted that the porosity of the brake pad can vary between about 0 to 30 percent of the pad. However, it is preferred that the porosity be minimized via procedures that will be discussed later to no more than about 10 percent by volume of the pad structure.

The second FRCMC material used in the back plate section includes a pre-ceramic resin in its ceramic state and fibers. In this case, the types and amounts of these constituents are generally chosen to impart the strength to the back plate section necessary to withstand compressive and bending forces placed upon it during braking. Here again, the pre-ceramic resin associated with the second FRCMC material can be any commercially available polymer-derived pre-ceramic resin, such as silicon-carboxyl resin or alumina silicate resin, and the fibers are preferably at least one of alumina, Nextel 312, Nextel 440, Nextel 510, Nextel 550, silicon nitride, silicon carbide, HPZ, graphite, carbon, and peat. However, in the case of the back plate section, the fibers take the form of at least one sheet of woven continuous fibers, where the fibers are oriented in the longitudinal direction of the back plate. Such a longitudinal orientation optimizes the back plate's resistance to bending under the aforementioned bending forces imposed on it during braking. Further, it is preferred that a sufficient number of woven fiber sheets are stacked together such that when fully compressed, the thickness of the stack is approximately the same as the desired thickness of the back plate section. In addition, it is preferred that each sheet of woven fibers contains the maximum possible percentage by volume of fibers so as to impart the maximum degree of strength possible to the back plate. The desired thickness of the back plate section should be chosen so as to exhibit a strength that exceeds any anticipated compressive and bending force imposed thereon. Preferably, the total percentage by volume of fibers contained within the second FRCMC material is within a range of about 30 to 60 percent, and the thickness of the back plate section is between approximately 0.10 and 0.30 inches.

The brake pad section also includes at least one extension protruding into the back plate section. These extensions are integrally molded into the back plate section so as to assist in anchoring the brake pad section to the back plate section. Preferably, two or more such extensions are employed depending on the size of the brake pad and back plate structure and the loads to which the structure will be subjected.

The above described integrated brake pad and back plate structure is preferably formed by the following steps:

(a) placing one or more sheets of woven, continuous fibers that have been saturated with a low viscosity pre-ceramic resin into a bottom portion of a female die of a mold;

(b) placing a quantity of FRCMC bulk molding compound comprising the aforementioned first FRCMC material into an upper portion of the female die on top of the woven fiber sheets;

(c) pressing a male die of the mold onto the female die so as to mold the brake pad and back plate structure in a cavity formed between the female and male dies. The bottom portion of the female die forms a first part of the cavity having a shape corresponding to the desired shape of the back plate section of the structure and the upper portion of the female die forms a second part of the cavity having a shape corresponding to the desired shape of the brake pad section of the structure;

(d) heating the mold at a temperature and for a time associated with the pre-ceramic resin that polymerizes the resin to form a fiber-reinforced polymer composite part;

(e) removing the polymerized composite part from the mold;

(f) heating the polymerized composite part at a temperature and for a time associated with the polymerized resin which pyrolizes it;

(g) immersing the pyrolized FRCMC structure, which contains pores formed during step (f), into a bath of a pre-ceramic resin to fill the pores;

(h) heating the FRCMC structure at a temperature and for a time associated with the resin filling said pores so as to transform it to a ceramic material; and (i) repeating steps (g) and (h) until the pore density within the FRCMC structure is less than a prescribed percentage by volume.

In regards to the step of placing one or more sheets of woven fibers into the bottom portion of the female die, there are two preferred methods of accomplishing this task. The first involves first adhering each sheet to adjacent sheets to form a stack of sheets with the fibers of each sheet running in the same direction. The stack of sheets is then cut to substantially match the desired outline of the back plate section and at least one hole is punched through the stack of sheets. The sheets are preferably cut so that the fibers will be oriented in the longitudinal direction of the completed back plate, although other ply orientation will also work. The hole or holes will fill with the bulk molding compound of the brake pad matrix during the compression step, thereby forming the previously described anchoring extensions. Once the pre-ceding steps are complete, the result is a back plate preform. The final step in this first process is to saturate the preform with pre-ceramic resin. The finished preform is then placed in the female die as described above.

The second preferred method involves forming a polymerized (i.e. green state) blank made of layered woven fiber cloth and then stamping out, via a machine tool or the like, the preforms for the back plate. The polymerized blank is formed by saturating rolls of woven fiber cloth equaling the desired number of woven fiber layers with a pre-ceramic resin. The fiber cloth of each roll has its fibers oriented longitudinally. The leading ends of each roll of fiber cloth are fed between a pair of heated, closely-spaced rollers to form stacked layers of the fiber cloth (e.g. five in the preferred embodiment). The fibers of each layer will all be oriented in the same direction. The hot rollers are rotated to draw the stacked layers of fiber cloth through a space between the rollers. This space is made small enough to compress the layers of fiber cloth together as they pass through, and the rotation speed of the rollers is set such that the pre-ceramic resin in the woven cloth layers is heated at a temperature and for a time necessary to polymerize the resin as it passes between the rollers. A continuous sheet of a polymerized composite comprising one or more layers of woven fiber cloth emerges from the rollers. This polymerized composite sheet constitutes a back plate blank. Next, at least one back plate preform is stamped out from the blank. Each preform has substantially the desired outline of the back plate section and at least one through-hole. In addition, each preform is stamped out in such a manner as to orient the fibers along the longitudinal direction of the preform. Finally, the surface of each preform is scuffed or roughened (such as by the use of sandpaper or the like) prior to it being placed in the bottom portion of the female mold used to form the integrated brake pad and back plate structure.

In addition to the just described benefits, other objectives and advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

FRCMC materials in general are made by combining any commercially available polymer-derived pre-ceramic resin, such as silicon-carboxyl resin or alumina silicate resin, with some type of fibers. These resins are capable of being converted to a ceramic material as will be described more fully later. Examples of appropriate pre-ceramic resins include BLACKGLAS™ sold by Allied Signal, CERASE™ sold by the Lanxide Corporation, SYLRAMIC™ sold by Dow Chemical, STARFIRE™ sold by the Starfire Corporation, and TOREN™ sold by the Toren Corporation. An example of an appropriate alumina silicate pre-ceramic resin is CO2 sold by Applied Polymerics. The types of fibers that might be employed include alumina, Nextel 312, Nextel 440, Nextel 510, Nextel 550, silicon nitride, silicon carbide, HPZ, graphite, carbon, or peat. The fibers impart strength or ductility to what would otherwise be a very brittle material. Strength is the measure of how much stress the structure can withstand before fracturing. In addition, FRCMC material can include filler materials preferably in the form of powders having particle sizes somewhere between about 1 and 100 microns. Filler materials are employed to alter certain characteristics of the material such as its coefficient of friction. The resin, fiber, and filler material (if used) mixture is formed into the shape of the desired structure via one of a variety of methods and heated for a time to a temperature, as specified by the material suppliers, which causes the resin to be converted into a ceramic.

Further, the fibers are preferably first coated with an interface material, such as carbon, silicon nitride, silicon carbide, silicon carboxide, boron nitride, or multiple layers of one or more of these interfacial materials. The interface material prevents the resin from adhering directly to the fibers of the fiber system. Thus, after the resin has been converted to a ceramic, there is a weak interface between the ceramic matrix and the fibers. This weak bond enhances the overall strength exhibited by the FRCMC material by allowing the fibers to slide in relation to the ceramic matrix, rather than break, when the material is subjected to a strain. In this way, crack propagation is minimized and the material's integrity is maintained.

Figure 4:
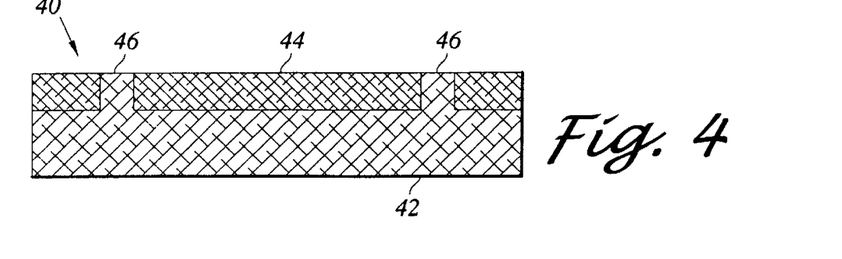
FIG. 4 is a cross-sectional view of an integrated FRCMC brake pad and back plate structure embodying the present invention.

A preferred integrated brake pad and back plate structure 40 embodying the present invention is shown in FIG. 4. The brake pad section 42 of the structure is made of FRCMC material modified for brake use in that it is not only able to withstand the heat and erosive forces associated with even the most demanding braking applications, but it will exhibit a high coefficient of friction as well. To increase the frictional coefficient of the material and therefore its braking efficiency, a friction-inducing filler material may be incorporated into the composite. Alumina, mullite, silica, silicon carbide, titania, silicon nitride, boron nitride, carbon, magnesium oxide, boron carbide, or any combination thereof would be examples of appropriate filler materials that would impart the desired characteristics. Such filler materials can comprise up to about 60 percent by volume of the brake pad section 42 when dispersed uniformly throughout the composite, as is the preferred case. However, it is noted that in some applications the filler material is not needed, such as when the fibers themselves impart a sufficient coefficient of friction to the material to satisfy the requirements of the braking application. The balance of the brake pad section 42 of the structure is ceramic material that was formed from the pre-ceramic resin discussed previously.

Varying the types, combinations and percentages of the filler materials, when used, allows for tailoring of friction coefficients of the FRCMC material and thus provides a varying "feel" to the user. This makes it possible to tailor the characteristics exhibited by the brake pad section 42 to its particular application. For example, in a racing car, it is desirable to have brake pads which exhibit a relatively high coefficient of friction (e.g. about 0.6), whereas a lower coefficient (e.g. about 0.4) is desired for passenger automobiles, trucks, and the like to ensure these vehicles can be stopped safely without wheel lockup. Thus, by varying the type and amount of filler material in the brake pad section 42, the coefficient of friction can be tailored as required by the application.

The back plate portion 44 of the structure 40 is made of FRCMC material modified to be strong enough so as to withstand the compressive and bending forces imposed upon it during braking. The strength of the FRCMC material can be controlled or tailored, in part, by choosing between a continuous woven fiber system or a non-continuous loose fiber system. A woven fiber system is referred to as being continuous due to the fibers typically running the entire length of the structure, whereas loose fibers are referred to as non-continuous as they can terminate within the structure itself. A woven fiber system provides the greatest amount of strength per unit of fiber volume, and so is preferred for the back plate portion 44. Additionally, in order to maximize the resistance of the back plate portion 44 to bending under the previously described bending forces imposed on it during braking, the fibers of the woven fiber system are preferably oriented in the longitudinal direction of the back plate. The woven fiber system is embodied in a preform made from stacked, woven, fiber sheets which has been formed into the desired shape of the finished part, and which has all of the fibers in each fiber sheet oriented in the longitudinal direction of the preform. Additionally, the strength of a FRCMC structure increases with increasing amounts of fibers (up to a fiber volume limit determined by the type of fiber and weave pattern employed). Thus, in the case of the back plate portion 44 of the structure where maximum strength is desired, as much fiber as practically possible should be used. In particular, the back plate portion 44 of the structure should contain between about 30 and 60 percent by volume of fibers having the aforementioned woven or braided form, but preferably should contain in excess of 35 percent to ensure optimum strength. Finally, the types of fibers chosen can to a lesser extent affect the strength of the FRCMC material. However, any of the fibers types mentioned previously, or any combination thereof, can be employed to produce the desired degree of strength when coated with the aforementioned interface coating.

Given that the type, form, amount, and orientation of the fibers are chosen to maximize the strength of the FRCMC material, the thickness of the back plate section 44 becomes the primary consideration in how much compressive and bending force the plate can withstand. Essentially, the thicker the back plate section 44 the more compressive force it will be able to withstand before fracturing, and the less susceptible it will be to bending. However, this thickness must be balance against increased weight and size. Although, the FRCMC back plate associated with the present invention is considerably lighter than a conventional metal back plate, minimizing its weight is still desirable in many applications. Thus, in these application, it is preferred that the back plate section 44 be just as thick as necessary to withstand the anticipated compression and bending forces plus some tolerance margin, but no thicker, so as to minimize its weight and size.

Most of the balance of the back plate section 44 of the structure 40 is ceramic material that was formed from the aforementioned pre-ceramic resin. There are no filler materials employed in the preferred embodiment of the structure. However, the back plate section 44 also has one or more areas constituting the material making up the brake pad section 42 of the structure. These areas are formed in a hole or holes cut through the layers of fiber sheets. Two such areas 46 formed in two holes cut through the fibers sheets are shown in FIG. 4. These areas 46, which are essentially extensions of the pad section 42 and integrated with the rest of the back plate section 44 via a common ceramic matrix, act to strengthen the connection between the two sections.

By way of example of an appropriate brake pad and back plate embodying the present invention, a tested embodiment comprised of a brake pad section having approximately 35 percent by volume of loose Nextel 312 fibers about 2.0 inches in length, and approximately 15 percent by volume of silicon carbide as a friction-inducing and hardening filler material. The balance of the pad section was made of ceramic material derived from BLACKGLAS™ pre-ceramic resin. This combination produced a brake pad section having a coefficient of friction at its surface of approximately 0.5 against a rotor made of FRCMC material having a woven fiber construction. The back plate section of the tested embodiment had five plies of Nextel 312 fibers in the form of woven fiber sheets constituting approximately 50 percent by volume of the section with the balance being the ceramic matrix produced from BLACKGLAS™ pre-ceramic resin. The back plate section had a thickness of 0.125 inches. This composition produced a back plate of adequate strength for a high speed motorcycle brake application. In addition, two holes were formed in the fiber sheets to accommodate the brake pad section anchors. Finally, it is also noted that the fibers in both sections were coated with one 0.1 to 0.5 micron thick layer of boron nitride as the chosen interface material.

Figure 5:
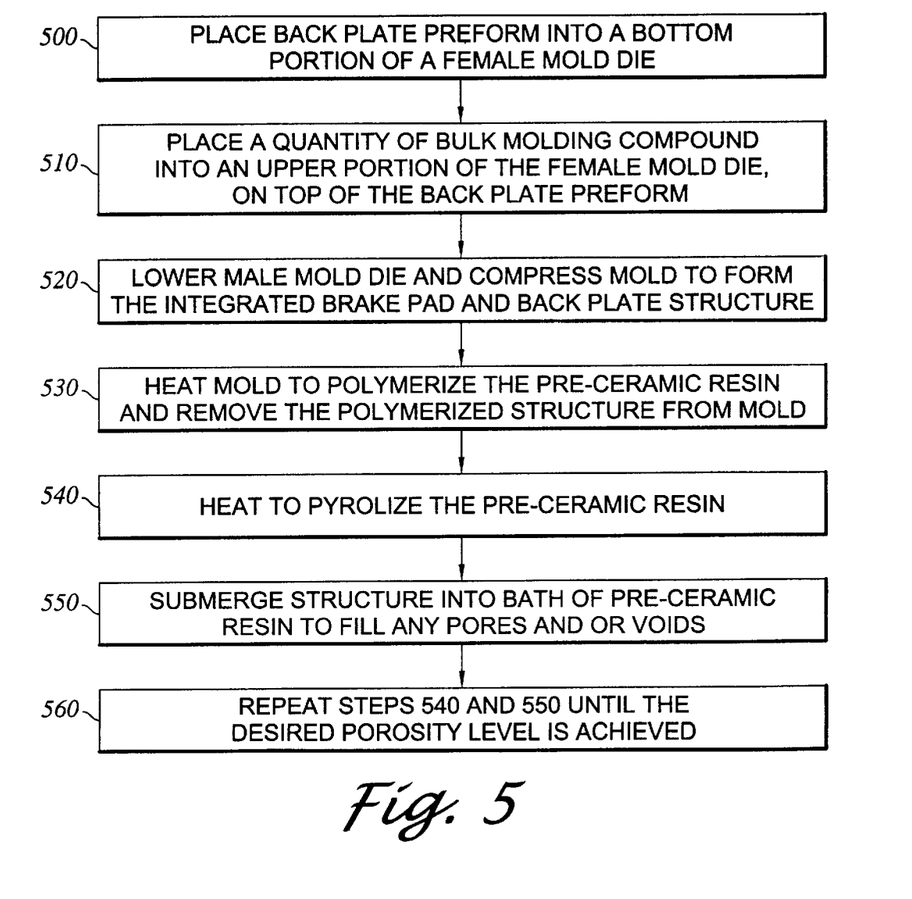
FIG. 5 is a block diagram of a method for the compression molding of the integrated FRCMC brake pad and back plate structure of FIG. 4.

The integrated brake pad and back plate made according to the present invention is referred to as having an integrated FRCMC structure because its brake pad section and its back plate section, although having differing types and forms of fibers and filler materials, are joined by a common ceramic matrix extending throughout the structure. This integrated FRCMC brake pad and back plate can be formed from the previously described materials by a variety of methods generally applicable to polymer composite part formation. One particularly preferred method of forming the integrated FRCMC brake pad and back plate structure is via a compression molding process as described in a copending application entitled COMPRESSION/INJECTION MOLDING OF POLYMER-DERIVED FIBER REINFORCED CERAMIC MATRIX COMPOSITE MATERIALS having the same inventors as the present application and assigned to a common assignee. This co-pending application was filed on Aug. 28, 1996 and assigned Ser. No. 08/704,348 now U.S. Pat. No. 5,738,818. The disclosure of this co-pending application is herein incorporated by reference. The following simplified process, summarized in FIG. 5, provides an example of using the aforementioned compression molding process to form the previously-described tested embodiment of an integrated FRCMC brake pad and back plate structure.

Figure 6:
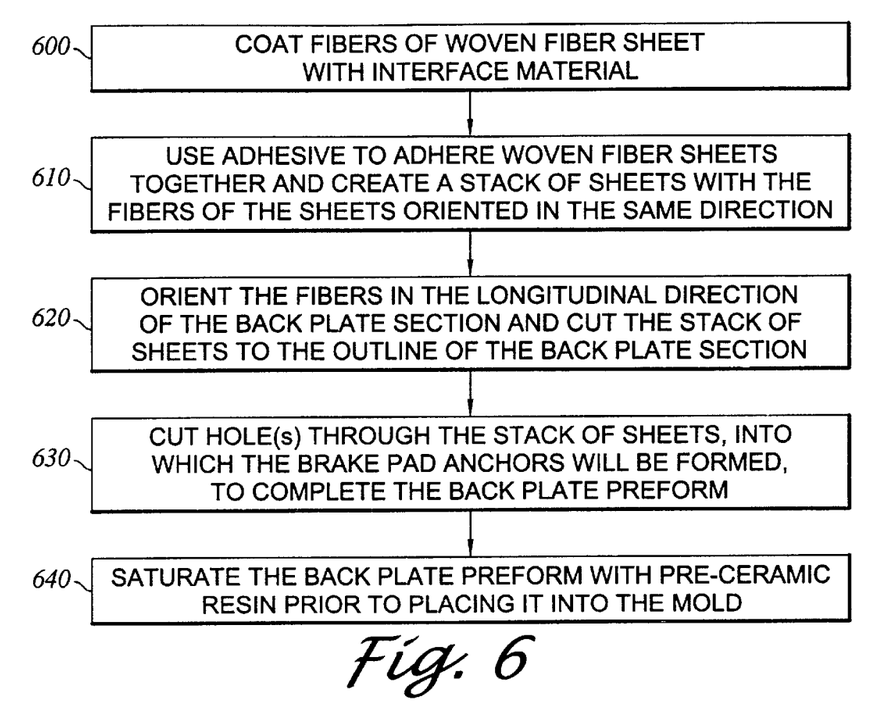
FIG. 6 is a block diagram of a first method for preparing a back plate preform for use in the method of FIG. 5.

1. The previously-described woven fiber sheets that will ultimately form the back plate section of the structure are placed in the bottom portion of the cavity of a female mold die (step 500). This female mold die has an overall shape which in combination with a male mold die forms a cavity therebetween having the desired shape of the brake pad and back plate structure. Specifically, there is the aforementioned bottom portion of the cavity that forms the back plate section of the structure, and an upper portion used to form the brake pad section of the structure. In a tested embodiment, five plies of a woven Nextel 312 fiber cloth was used. The fiber cloth is saturated with a low viscosity, pre-ceramic resin, which in the case of the tested embodiment was BLACKGLAS™ resin having a viscosity of less than 10 centipoises. The fiber sheets are saturated with pre-ceramic resin to ensure there are no significant voids in the finished part that could weaken its structure. In addition, prior to saturating the sheets with resin, it is preferred that the fibers be coated with the aforementioned interface material(s). Here again, one 0.1 to 0.5 micron thick layer of boron nitride was chosen as the interface material. Each sheet of fiber cloth is preformed and shaped so as to have the outline of the back plate section. The fiber sheets are preferably placed into the mold as a unit referred to as a back plate preform, rather than separately. One method of accomplishing this, as shown in FIG. 6, is to first coat the fibers of the woven fiber sheets with the aforementioned interface material (step 600). Next, the woven fiber sheets are stuck together using an appropriate adhesive (step 610), such as a spray tack adhesive produced by the 3M Corporation, to form a stack. The fiber sheets are stuck together so that the fibers all run in the same direction. Once the stack is complete, the fiber sheets are cut as a unit to the outline shape of the back plate section, preferably with the fibers running in the longitudinal direction of the preform (step 620). In addition, the holes (e.g. two in the tested case), which will form the aforementioned anchors for the brake pad section, are punched through the sheets (step 630). Finally, the now preformed sheets are saturated with the resin (step 640) and placed into the mold. It is noted that instead of using an adhesive to stick the woven fiber sheets together, the sheets could be sewn together using a compatible thread.

2. Next, a quantity of pre-mixed bulk molding compound is placed in the upper portion of the female mold die on top of the back plate preform (step 510). The bulk molding compound will ultimately become the brake pad section, and so should be made up of the amount of chopped fiber which once distributed and packed in the mold will produce the desired percent volume of fiber, which in the case of the tested embodiment was about 35 percent by volume. In addition, the molding compound can include the amount of filler material which once distributed and packed in the mold will constitute the desired percent by volume. In the case of the tested embodiment a filler material was employed. Specifically, silicon carbide was used as the filler material and made up approximately 15 percent by volume of the pad section. Finally, the molding compound of this example has the amount of BLACKGLAS™ pre-ceramic resin which at a reasonable viscosity (e.g. about 5,000 to 10,000 centipoises) will facilitate the flow of fibers and filler material, while still allowing it to pass around packed fibers and filler material and out of the resin outlet ports of the compression mold, as described in the aforementioned co-pending application. Additionally, prior to mixing into the bulk molding compound, it is preferred that the fibers be coated with the aforementioned interface material(s). In this case, one 0.1 to 0.5 micron thick layer of boron nitride was chosen as the interface material.

3. Next, referring once again to FIG. 5, the male die is lowered and the mold compressed to form the integrated brake pad and back plate structure (step 520). As the mold is compressed, some of the resin present in the bulk molding compound and the saturated fiber sheets will mix together, while the excess resin is ejected from the mold through the mold's resin outlet ports. If the fiber sheets have a tight-weave structure (i.e. relatively dense, as they preferably would be to maximize strength), then the fibers and filler materials present in the bulk molding compound will not readily flow into the fiber sheets of the back plate section. Thus, the fibers and filler materials will remain in the pad section and not effect the characteristics of the back plate section. The only exception is the quantity of bulk molding compound forced by the compression into the aforementioned holes in the back plate preform to form the anchoring projections of the pad section.

4. The molded brake pad and back plate structure is then heated within the mold to polymerize the resin and then removed from the mold (step 530). The following cycle (as recommended by the manufacturer of the BLACKGLAS™ resin) is preferred:

A) Ramp from ambient to 150° F. at 2.7°/minute

B) Hold at 150° F. for 30 minutes

C) Ramp at 1.7°/minute to 300° F.

D) Hold at 300° F. for 60 minutes

E) Cool at 1.2°/minute until temperature is below 140° F.

It should be noted that there are a variety of heat-up cycles that will create usable hardware and the foregoing is by way of one example only and not intended to be exclusive. Once the heating cycle is complete, the structure is in a "green state" similar to bisque-ware in ceramics, such that it does not have its full strength as yet, but can be handled.

5. The now polymerized brake pad and back plate structure is pyrolized in an controlled inert gas environment as suggested by the resin manufacturer (step 540). This pyrolization process preferably involves firing the structure per the following schedule (as recommended by the resin manufacturer):

A) Ramp to 300° F. at 223°/hour

B) Ramp to 900° F. at 43°/hour

C) Ramp to 1400° F. at 20°/hour

D) Ramp to 1600° F. at 50°/hour

E) Hold at 1600° F. for 4 hours

F) Ramp to 77° F. at −125°/hour

Again, there are a variety of heating schedules other than this one, which is given by way of example only, that will yield usable hardware.

7. Upon cooling, the now pyrolized brake pad and back plate structure is preferably submerged in a bath of BLACK-GLAS™ pre-ceramic resin for enough time to allow all air to be removed from the component, typically 5 to 60 minutes (step 550). This step fills any outgassed pores formed in the structure during the pyrolization process. Minimizing the porosity of the structure maximizes its strength. A vacuum infiltration may also be used to expedite the process.

8. The pre-ceding two heating and submerging steps are then repeated until the remaining outgassed pores are below a desired level. The end point porosity can vary between 0 to 30 percent depending on the strength required of the brake pad and back plate structure for the particular braking application. However, it is preferred that the porosity level be less than 10 percent by volume for most applications. Typically, the submerging and heating cycle must be repeated five times to obtain this preferred porosity level (step 560). However, if a greater porosity level is acceptable, the cycle can be repeated fewer times. Once the desired porosity level is achieved, the integrated FRCMC brake pad and back plate is then ready for use.

Figure 7:
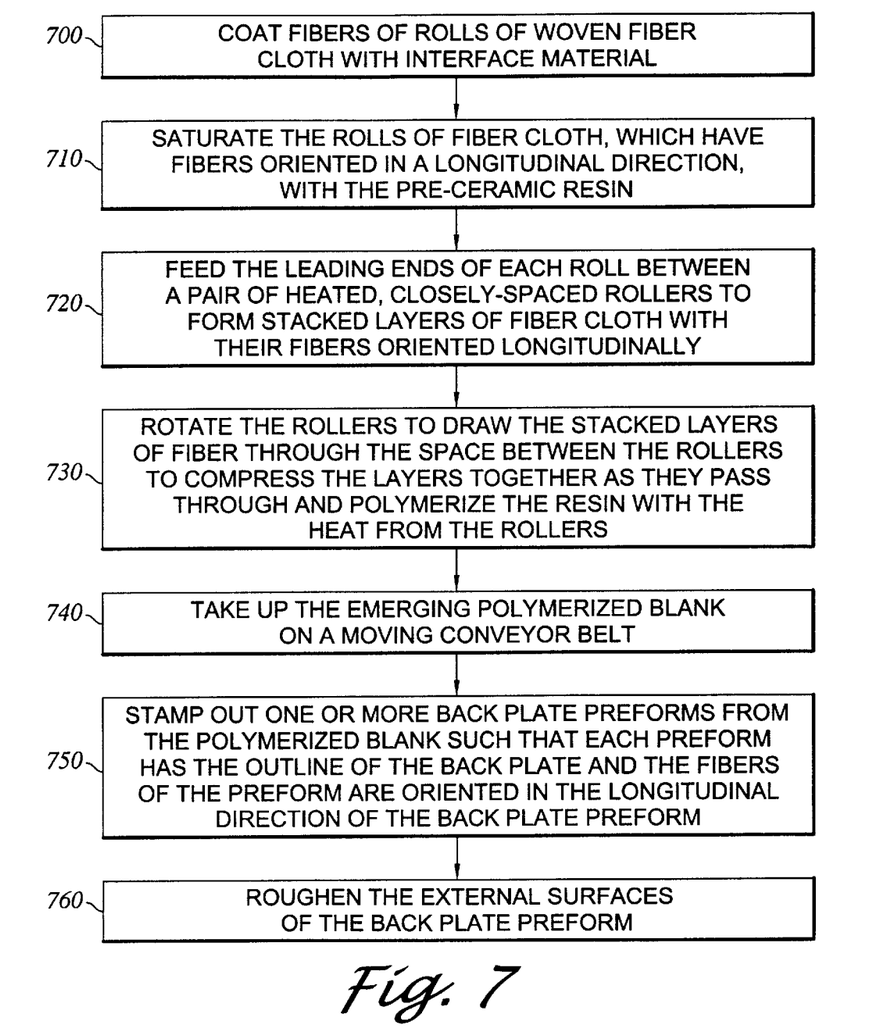
FIG. 7 is a block diagram of a second method for preparing a back plate preform for use in the method of FIG. 5.
Figure 8:
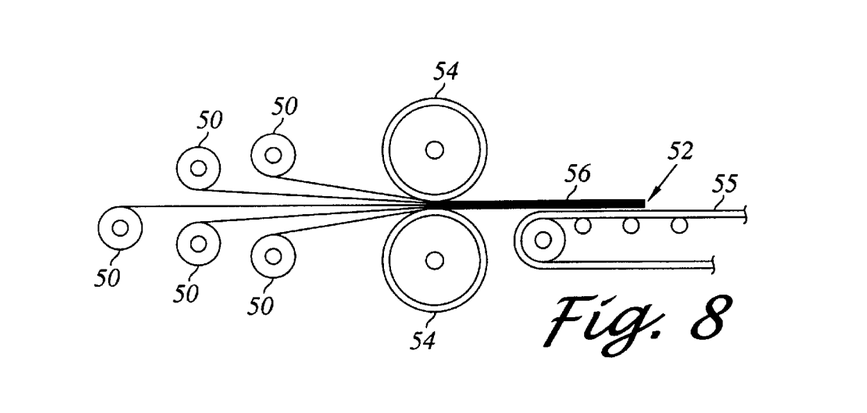
FIG. 8 is a simplified side view of an apparatus used to form a polymerized blank needed to produce the back plate preform via the method of FIG. 7.

An alternate method of preparing the woven fiber preform for insertion as a unit into the mold could also be employed. This alternate method entails forming a polymerized (i.e. green state) blank made of layered woven fiber cloth and then stamping out, via a machine tool or the like, the preforms for the back plate. Preferably, the following steps summarized in FIG. 7 would be employed to accomplish the alternate method of preparing the woven fiber preforms. Rolls 50 of woven fibers cloth equaling the desired number of fiber layers are saturated with pre-ceramic resin (step 710), as shown in FIG. 8. In the case depicted in FIG. 8, five plies are desired, and so five rolls of fiber cloth are employed. The fiber cloth of each of the rolls 50 is preferably saturated with pre-ceramic resin having a low viscosity to ensure complete saturation of the sheets. In addition, prior to saturating the fiber cloth with resin, it is preferred that the fibers be coated with the aforementioned interface material (step 700). In step 720, the leading ends 52 of the fiber cloth on each roll 50 are fed between a pair of heated, closely-spaced rollers 54 in a manner that creates fiber cloth layers (i.e. five in this example). The heated rollers 54 are rotated so as to draw the layers of fiber cloth through the space between the rollers (step 730). The rollers 54 are spaced from each other by a distance that causes the layers of fiber cloth to be compressed together as they pass through the rollers. Additionally, the speed of the heated rollers 54 is set such that the pre-ceramic resin in the cloth layers is heated to a temperature and for a time necessary to polymerize the resin as it passes between the rollers. Thus, a continuous sheet 56 of a polymerized composite comprising one or more layers of woven fiber cloth emerges from the rollers 54. The emerging sheet 56 is taken up by a moving conveyor belt 55 (step 740). This polymerized composite sheet 56 constitutes a back plate blank for the purposes of the present invention. Next, one or more (an preferably many) back plate preforms are stamped from the blank (step 750). Each preform will have the outline of the back plate and the hole or holes used to form the brake pad anchors. Stamping methods appropriate to produce the preforms are well known and any may be employed. As the stamping method does not form a novel part of the present invention, no further details will be provided herein. Finally, the external surface of the polymerized back plate is scuffed or otherwise roughened via any appropriate known method (step 760), such as with the use of sandpaper of the like, to improve the integration of the section with the brake pad during the compression molding thereof. It is noted that this alternate method is preferred when the brake pad and back plate structure embodying the present invention is to be mass produced, as this method can be more readily automated than the previously discussed method of adhering the fiber sheets together and cutting out the preforms.

It is further noted that although the above-described compression molding process is preferred, other methods could be employed if desired. For example, resin transfer molding (RTM) or injection molding processes may be feasible. Regardless, it is not intended to limit the invention to any particular method. Rather any appropriate method may be employed to form the integrated FRCMC brake pad and back plate structure according to the present invention.

While the invention has been described in detail by reference to the preferred embodiment described above, it is understood that variations and modifications thereof may be made without departing from the true spirit and scope of the invention. For example, while the use of the brake pad and back plate structure embodying the present invention has been described in context of its use on a vehicle of some kind, this need not be the case. Rather, the structure could be employed with any type of braking system. For example, the structure could be useful in braking systems used in industrial machinery and machine tools.

Wherefore, what is claimed is:

1. A method of forming an integrated fiber reinforced ceramic matrix composite (FRCMC) brake pad and back plate structure comprising the steps of:

(a) placing at least one sheet of woven, continuous fibers which has been saturated in a pre-ceramic resin into a bottom portion of a female die of a mold;

(b) placing a quantity of FRCMC bulk molding compound into an upper portion of the female die of the mold on top of the at least one woven fiber sheet, said FRCMC bulk molding compound comprising a pre-ceramic resin and loose fibers;

(c) pressing a male die of the mold onto the female die so as to mold said brake pad and back plate structure in a cavity formed between the female and male dies, said bottom portion of the female die forming a first part of the cavity having a shape corresponding to a desired shape of a back plate section of the structure and the upper portion of the female die forming a second part of the cavity having a shape corresponding to a desired shape of a brake pad section of the structure;

(d) heating the mold at a temperature and for a time associated with the pre-ceramic resin that polymerizes the resin to form a fiber-reinforced polymer composite part;

(e) removing the polymerized composite part from the mold;

(f) heating the polymerized composite part at a temperature and for a time associated with the polymerized resin which pyrolyses it;

(g) immersing the FRCMC structure containing pores formed during step (f) into a bath of a pre-ceramic resin to fill the pores;

(h) heating the FRCMC structure at a temperature and for a time associate with the resin filling said pores so as to transform it to a ceramic material; and (i) repeating steps (g) and (h) until the pore density within the FRCMC structure is less than a prescribed percentage by volume.

2. The method of claim 1, wherein the pre-ceramic resin saturating the at least one sheet of woven fibers is a low viscosity pre-ceramic resin having a viscosity sufficiently low to ensure complete saturation thereof.

3. The method of claim 1, wherein the step of placing the at least one sheet of woven fibers into the bottom portion of the female die comprises placing a back plate preform comprising at least two stacked sheets of woven continuous fibers into the bottom portion, and wherein the placing step is preceded by the forming of the back plate preform via the steps of:

adhering each sheet to an adjacent sheet to form a stack of sheets with the fibers of all the sheets oriented in the same direction;

cutting the stack of sheets to substantially match the desired outline of the back plate section, wherein the stack of sheets is cut so that the fibers are oriented in a longitudinal direction of the preform;

punching at least one hole through the stack of sheets; and saturating the stack of sheets with said pre-ceramic resin.

4. The method of claim 1, wherein the step of placing the at least one sheet of woven fibers into an upper portion of the female die comprises placing a back plate preform comprising at least two stacked sheets of tightly woven continuous fibers into the upper portion, and wherein the placing step is preceded by the forming of the back plate preform via the steps of:

saturating rolls of woven fiber cloth equaling the number of woven fiber sheets desired with said pre-ceramic resin, wherein the fibers of each roll of woven fiber cloth are oriented in a longitudinal direction;

feeding leading ends of each roll of fiber cloth between a pair of heated, closely-spaced rollers to form stacked layers of the fiber cloth wherein all the fibers are oriented in the longitudinal direction;

rotating the rollers to draw the stacked layers of fiber cloth through a space between the rollers, said space being small enough to compress the layers of fiber cloth together as they pass through, and the rotation speed of the rollers being set such that the pre-ceramic resin in the woven cloth layers is heated at a temperature and for a time necessary to polymerize the resin as it passes between the rollers to form a polymerized composite blank;

stamping out at least one back plate preform from the polymerized blank, each preform having substantially the desired outline of the back plate section and at least one through-hole, and the fibers of each preform being oriented in a longitudinal direction of the preform; and roughening the surface of each preform.

5. The method of claim 1, wherein the bulk molding compound further comprises a filler material, said filler material comprising a material which causes the brake pad section to exhibit a greater coefficient of friction than would be exhibited in the absence of the filler material.

6. The method of claim 5, wherein a sufficient quantity of the filler material is incorporated into the bulk molding compound so as to produce a prescribed coefficient of friction.

7. The method of claim 1, wherein a sufficient number of woven fiber sheets are stacked together such that when fully compressed together the thickness of the stack is approximately the same as the desired thickness of the back plate section.

8. The method of claim 7, wherein each sheet of woven fibers contains a maximum possible percentage by volume of fibers, and wherein the desired thickness of the back plate section is chosen so as to exhibit a strength which exceeds any anticipated compressive and bending forces imposed thereon.

* * * * *